United States Patent [19]
Crane et al.

[11] 3,804,496
[45] Apr. 16, 1974

[54] TWO DIMENSIONAL EYE TRACKER AND METHOD FOR TRACKING AN EYE

[75] Inventors: Hewitt D. Crane, Portola Valley, Calif.; Tom N. Cornsweet, Chevy Chase, Md.

[73] Assignee: Stanford Research Institute, Menlo Park, Calif.

[22] Filed: Dec. 11, 1972

[21] Appl. No.: 314,265

[52] U.S. Cl.................... 351/6, 250/206, 250/221, 351/13, 351/16, 351/39, 356/152
[51] Int. Cl...... A61b 3/10, G01b 11/26, H01j 39/12
[58] Field of Search............. 351/1, 6, 7, 13, 16, 39; 250/206, 221; 340/279; 356/152

[56] References Cited
UNITED STATES PATENTS

| | | | |
|---|---|---|---|
| 3,462,604 | 8/1969 | Mason | 351/6 X |
| 3,507,988 | 4/1970 | Holmes | 250/221 X |
| 3,663,098 | 5/1972 | Merchant | 351/16 X |

*Primary Examiner*—Paul A. Sacher
*Attorney, Agent, or Firm*—Paul D. Flehr

[57] ABSTRACT

An eye tracker for continuously tracking orientation of the optic axis of an eye in which the eye is flooded with light so that Purkinje images are formed. Two of the Purkinje images are deflected so as to incident on photodetectors. The eye tracker includes optic means for forming an image of the eye with input and output optics arranged to operate on the image of the eye rather than the eye itself. A relatively small two-dimensionally pivoted mirror is disposed at the center of rotation of the image of the eye so as to have fast response to rotation movements of the eye. Further, servo means are provided for moving split-field photodetectors on which the first and fourth Purkinje images are incident. Tracking the position of the Purkinje images through the photocells gives an indication of the orientation of the optic axis of the eye.

11 Claims, 4 Drawing Figures

TWO DIMENSIONAL EYE TRACKER AND METHOD FOR TRACKING AN EYE

BACKGROUND OF THE INVENTION

This invention pertains to an eye tracker and more particularly pertains to an eye tracker for continuously tracking orientation of the optic axis of an eye by monitoring Purkinje images formed by reflecting surfaces within the eye.

There are many areas of both research and possibilities for commercial application in which it is desirable to have available electrical signals proportional to the orientation of the optic axis of a human observer's eye. Research on the mechanics of eye movement, on many areas of visual perception and on visual search patterns would all be greatly aided by such a device. Commercial applications include the use of the eye to control other systems. For example, a computer operator might simply look at any one of a number of symbols or locations displayed in front of him and press a button, introducing the value corresponding to that location into the computer. Similarly, a servo system for controlling a gun or camera could automatically be aimed at whatever object an observer visually was fixating.

The prior art contains many methods for attempting to track eye movement. In one such method a tightly fitted contact lens is attached to the eye and either a light source, a mirror, or a coil of wire is attached to the lens. Movements of the eye can then be monitored by electro-optical tracking or photography. This method has the obvious shortcoming that the lens must fit tightly on the eye, producing some discomfort. Further, in order to get a tight fit, either each lens must be individually constructed to fit the particular observer, or the observer's eye must be anesthetized and the lens attached to it by suction, a difficult and slightly risky procedure.

Another prior technique for tracking eye movement is the electro-oculogram. This method is based upon the fact that physiological events within any mammalian eye result in the maintenance of a voltage between the cornea and the surrounding tissue, such as the forehead. Therefore, if two electrodes are placed say, one on the skin above and the other below the eyeball, vertical rotations of the eye will result in corresponding changes in the voltage between the electrodes. A recording of such a voltage is called an electro-oculogram. The accuracy of this technique is limited by many factors, such as the slow changes in the resting potential with time of day, state of adaption, etc. Further, the electrical noise level resulting from stray bioelectric potentials limit the resolution of this technique.

Another prior art tracking technique can be described as tracking a feature of the front of the eye. When the eye rotates in its socket the location of any feature of the front of the eye, such as the iris or a blood vessel on the white, moves accordingly. Therefore, photography of electro-optical tracking of such a feature provides a method of recording eye position. When the eye rotates horizontally, the front of the eye moves horizontally. If the head moves sideways, however, such as in translation, the eyeball shifts sideways in its socket and the front of the eye also moves horizontally. Therefore, using these techniques there is no way to distinguish lateral movements of the eye from rotations of the eye. For accurate tracking of the eye it is necessary that there be some way to distinguish the two. For example, a rotation of 1° moves the front of the eye by 0.2 mm, and it is thus indistinguishable from a lateral shift of 0.2 mm. On the other hand, the vissual effects of rotation are drastically different from those of translation. If an object being viewed is 2 meters away, a lateral movement of 0.2 mm changes the place being looked at by 0.2 mm, while a rotation of one degree (which looks the same to the recording device) changes the place being looked at by 35 mm. And the further away the target is, the larger the discrepancy becomes between the effects of lateral and rotational movements. Therefore, when the technique used to record eye movement involves the monitoring of the location of any point on the front of the eye, lateral movement results in artifacts. Since it is impossible to prevent the eye from moving laterally in its socket, the error of these techniques cannot be less than about 15 to 30 minutes of arc (corresponding to lateral shifts of the eye of 0.05 to 0.1 mm).

Another prior art technique for eye tracking is what is known as an oculometer. The oculometer tracks the corneal reflection and the inside edge of the iris. Because the center of curvature of the cornea is at a different distance from the center of rotation of the eye than the plane of the iris, these two "landmarks" move with respect to each other under eye rotation but not under translation. What the oculometer basically does is measure the relative position of the corneal reflection with respect to the center of the pupil of the eye. Although it is immune to the effects of translation of the eye, it has an inherent problem. This problem is that the iris muscle changes its state, changing the size of the pupil, as a function of a number of factors, such as light intensity, emotional state, state of focus of the eye, etc. While the oculometer might not be bothered directly by changes in the diameter of the pupil, it is affected by unsymmetrical changes in pupil size. As it is well known to those skilled in the art, it is extremely rare to find someone whose pupils contract symmetrically. It is almost always the case that when the pupil changes its size, its center changes position with respect to the eye, just because the iris muscle does not contract exactly symmetrically. Very slight asymmetries in this contraction can cause large errors — a 10th of a millimeter of asymmetry is the equivalent of about half a degree of error — and normal pupils can change their diameter from 2 to 8 mm.

There is disclosed in applicant's copending applications Ser. No. 132,747 filed Apr. 9, 1971 and Ser. No. 132,678 filed Apr. 9, 1971, a method and systems for tracking orientation of the optic axis of the eye utilizing Purkinje reflections from the eye. As light passes through an eye, reflections occur at every interface at which there is a change in dielectric constant. There are in particular four surfaces where such reflections occur. The images formed by these reflections are well known to those skilled in the art and are generally referred to as Purkinje images. The virtual image of a light source that is formed by light reflected from the front of the cornea is referred to as a first Purkinje image or simply the corneal reflection. A second Purkinje image, formed by light reflected from the rear surface of the cornea is almost exactly coincident with the first Purkinje image though more than 100 times dimmer because of the much smaller dielectric change from cornea to aqueous. Light that passes through the cornea passes in turn through the aqueous humor and then the lens of the eye. The third Purkinje image, also a virtual image, is formed by light reflected from the front surface of the lens. This image is larger and more diffuse than the other Purkinje images and is formed in a plane relatively far removed from the plane of the other images. The fourth Purkinje image is formed by light reflected from the rear surface of the eye lens, where the lens forms an interface with the vitreous humor that fills the bulk of the eyeball. This rear surface of the lens acts as a concave mirror, forming a real image of the source.

In copending application Ser. No. 132,747 filed Apr. 9, 1971, a method and system for tracking eye movements utilizing Purkinje reflections is disclosed in whch the optical input and output paths to the eye are fixed in space. However, as the eye rotates, changes in angle between the eye axis and the input and output optical paths can cause changes and distortions in the imaging process and therefore reduce the accuracy of the system. This can be a problem especially when trying to realize operating fields larger than a few degrees.

In copending application Ser. No. 132,678, filed Apr. 9, 1971, there are disclosed improved eye tracker embodiments intended to maintain a constant relationship between the eye axis and the input and output optical paths of the eye trackers. These embodiments are quite useful and beneficial in small field trackers, but are somewhat difficult to implement for large fields of operation. One of the major difficulties when considering large fields of operation is that the necessary servo swings becomes very large. If lineal-acting servos are utilized they must have a large field of travel, while if rotating mirrors are used they must be of a large size. In either case, this is not only awkward mechanically, but it then becomes more and more difficult to achieve the desired transient response from the system. This leads not only to an accuracy problem during a transient response but can lead to difficulty in operation of the system itself. For example, if the instrument does not track closely enough, then light from the eye iris can enter the measuring system and cause the instrument to become unlocked.

OBJECT AND SUMMARY OF THE INVENTION

It is an object of this invention to provide a method and system for tracking eye movements through monitoring Purkinje reflections from the eye in which a relatively fixed relationship is maintained between the eye axis and the input and output axes of the instrument.

It is another object of this invention to provide a method and system for tracking eye movements through monitoring Purkinje reflections from an image of the eye.

It is another object of this invention to provide a method and system for tracking eye movements through monitoring Purkinje reflections from the eye in which horizontally displaced Purkinje images are used to measure vertical eye movements and vertically displaced Purkinje images are used to measure horizontal eye movements.

Briefly, in accordance with one embodiment of the invention, an eye tracker is provided for tracking orientation of the optic axis of an eye having a center of rotation and a cornea and a lens where the eye can translate in a vertical and a horizontal direction and can rotate vertically and horizontally about its center of rotation. Optical means are provided for forming an image of the eye and a pivoted reflecting surface is disposed in the eye image pivoted about the center of rotation of the eye image. Light is projected into the eye image so that first and fourth Purkinje images are formed. Photodetecting means are provided which are adapted to generate electrical signals in response to light images falling thereon. Centering means are provided which are responsive to the electrical signals for centering the first and fourth Purkinje images on the photodetecting means. The centering means includes means for moving at least a portion of the photodetecting means and for rotating the two-dimensionally pivoted reflecting surface.

DESCRIPTION OF THE PREFERRED EMBODIMENTS

The eye tracker embodiments disclosed herein evolved from trying to find a way to make a wide-field system that would have good transient response and accuracy on the order of a few minutes of arc. To achieve this goal it is necessary to implement a system in which rapid response is not required from any element except, at most, a small two-dimensionally gimballed mirror. By small is meant an inch or two in diameter or less.

To known where an eye is looking it is necessary to know both the angle of the visual axis in space and the absolute (translational) position of the eye. The angle of the eye with respect to the head is irrelevant. Because the eye can move very rapidly in its socket, an eye tracker must have a good high frequency response with respect to rotation. However, the head (and therefore the eye) moves relatively slowly in translation. Translation response of just a few cycles per second is adequate, whereas rotational response must be on the order of 50–100 cycles per second.

If an eye tracker were arranged to travel along the surface of a sphere whose center was coincident with the center of rotation of the eye, and if the tracker always moved to the point where the eye axis intersected the spherial surface of travel, then no matter where the eye pointed the relationship between the eye and instrument would remain constant so that accuracy would be maintained over a large field. To know exactly where the eye were looking it would only be necessary to measure the position of the instrument. An obvious difficulty with this scheme is being able to move the bulky measurement system over such large distances and with adequate frequency response to track the very rapid motions of the eye. To circumvent the need to move a bulky measuring instrument the possibility can be considered of keeping the instrument fixed and moving a two-dimensional mirror in a combined translation-rotation mode. But even here there woFld be difficulty in achieving adequate frequency response unless the mirror can be brought close to the eye so that it can be very small in size; the closer the mirror can be brought to the eye the smaller and more compact it can be. In fact, the ideal location for such a mirror is for its center of rotation to coincide with the center of rotation of the eye. Only at this location can rotations of the eye be tracked with pure rotation of the mirror. The solution, in accordance with this invention, of how to arrange a system so that a two-dimensional mirror can be pivoted around the center of rotation of the eye itself is to arrange for the instrument to operate on an image of the eye.

Figure 1:
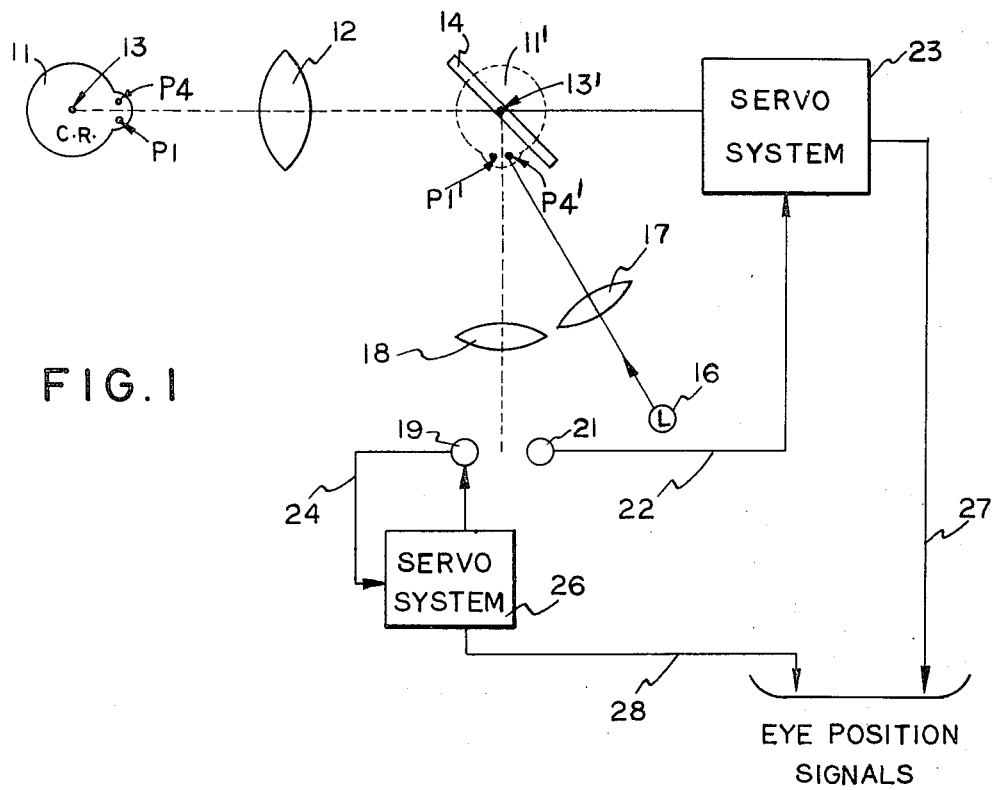
FIG. 1 is a schematic diagram of an eye tracker in accordance with the invention in which an eye image is formed with a lens system.

Referring to FIG. 1, there is shown in schematic form such an eye tracker in accordance with this invention which operates on an image of the eye. An eye 11 is imaged by a lens system 12 so that an image 11' of the eye is formed, illustrated by the dashed line in FIG. 1. The eye 11 has a center of rotation indicated by reference numeral 13 and the eye image 11' has a corresponding center of rotation 13'. A relatively small two-dimensionally gimbaled mirror 14 is pivoted at the center of rotation 13' of the eye image 11'. Light from a light source 16 is projected into the eye image 11' by a lens 17 which light effectively illuminates the real eye 11, so that Purkinje reflections occur. The first and fourth Purkinje images are formed by reflections at the cornea and the rear of the eye lens, respectively, and are indicated by reference characters P1 and P4.

The two Purkinje images P1' and P4' in the eye image 11' are focused by a lens system 18 onto two quadrant photodetectors 19 and 21. The first Purkinje image P1' is focused on photodetector 21 while the fourth Purkinje image P4' is focused on the photodetector 19. The quadrant photodetectors 19 and 21 each have four separate fields which are interconnected in accordance with techniques described in copending application Ser. No. 132,678 filed Apr. 9, 1971, so as to develop imbalance electrical signals when the light images falling thereon are off center. The photodetector 21 on which the first Purkinje image is focused supplies such an imbalance electrical signal over a circuit 22 to a servo system 23. The servo system 23 is a two-dimensional XY servo system which controls the two-dimensional pivoting of the mirror 14 about the center of rotation 13' of the eye image 11'. The servo system 23 pivots the mirror 14 in response to imbalance electrical signals on circuit 22 so that the first Purkinje image incident on photodetector 21 is again centered thereon and the imbalance electrical signals cease.

In a similar fashion the photodetector 19 on which the fourth Purkinje image is focused supplies an imbalance electrical signal over a circuit 24 to a servo systm 26. The servo system 26 is also a two-dimensional XY servo system which controls X and Y translation of the photodetector 19. The servo system 26 translates in X and Y directions the photodetector 19 so as to center the fourth Purkinje image thereon so that the imbalance electrical signals over circuits 24 cease.

Utilizing an eye tracker system such as shown and described in connection with FIG. 1 yields several important advantages. The pivoted mirror 14 is relatively small, i.e., on the order of 1 to 2 inches in diameter or less, and can be moved very rapidly by the servo system 23 to track the rapid rotational movements of the eye 11. Movement of the mirror 14 is all that is necessary to track purely rotational movements of the eye 11. That is, for pure rotation movements of the eye 11 if the first Purkinje image is centered on the photodetector 21 then the fourth Purkinje image will automatically be centered on the photodetector 19 so that no imbalance electrical signal appears on circuit 24. If there is a combination of rotation and translation movement of the eye 11, the pivoting mirror 14 controlled by servo system 23 tracks rapidly the rotational movement to keep the first Purkinje image centered on the photodetector 21 while the servo system 26 tracks the relatively slower translation movement to keep the fourth Purkinje image centered on the photodetector 19. The servo system 23 provides position output information on a circuit 27 as to the rotational orientation of the eye 11 and the servo system 26 provides position output information on a circuit 28 as to the translational position of the eye 11.

A further advantage of a system such as shown in FIG. 1 is that the bright first Purkinje images are used to control the high speed two-dimensional mirror, the movements of which normally counteract the effect of eye rotation. The dim fourth Purkinje image functions only to correct for translational motions of the eye. An important consequence of this arrangement is that whenever the first Purkinje image is properly located on its photodetector, the fourth image is also properly located on its photodetector, except for the small displacements due to translation. This facilitates "finding" the eye automatically when a subject first gets into the instrument, and also for recovering the Purkinje images after an eye blink, which might well unlock the tracking system. Thus, in summary, the very bright first Purkinje image is tracked to provide rotational position information of the eye. For pure rotation the very dim fourth Purkinje image is automatically centered on its respective photodetector when the first Purkinje image is centered on its photodetector. The photodetector on which the fourth Purkinje image is incident then only needs to be translated to correct for small translational position changes.

There are a few problems with utilizing a lens system 12 such as shown in FIG. 1 for forming the eye image 11'. A very large diameter low f-number optical system is required, which is difficult to achieve even with a highly compound lens system. There is also the problem with a compound lens system that the reflections of the input light at the many lens surfaces, unless properly blocked or removed, can easily swamp the very low light level from the returning fourth Purkinje image. Another embodiment of the invention which eliminates this potential problem is shown in FIG. 2.

Figure 2:
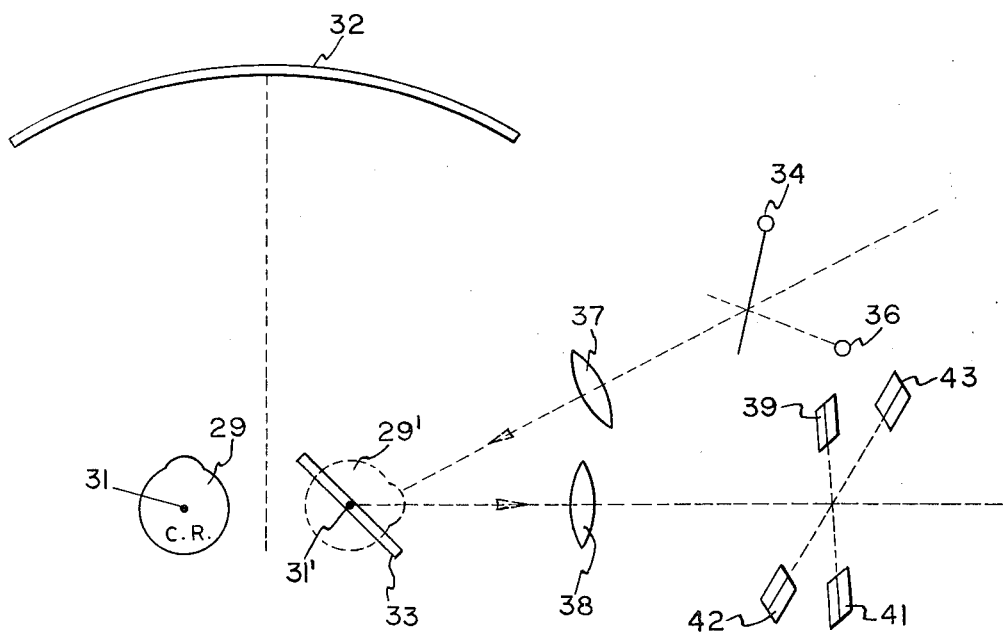
FIG. 2 is a schematic diagram of an eye tracker in which an eye image is formed with a concave mirror and in which two light sources and two pairs of split-field photodetectors are utilized.

In FIG. 2 there is shown an eye 29 having a center of rotation 31. A concave mirror 32 is provided which forms an image of the eye 29, which is indicated by the dash lines and the reference numeral 29' in FIG. 2. The eye image 29' has a corresponding center of rotation indicated by reference numeral 31'. As before, a relatively small mirror 33 is pivoted about the center of rotation 31' of the eye image 29'. Two light sources 34 and 36 are provided, the light from which is projected into the eye image 29' by a lens system 37. As illustrated schematically in FIG. 2, the light source 34 is vertically displaced with respect to the axis of the eye whereas the light source 36 is horizontally displaced with respect to the axis of the eye. Typically, the displacement angles of the light sources with respect to the axis of the eye are on the order of 15°. Light from the vertically displaced light source 34 forms a first and fourth Purkinje image pair in the eye image 29' which is imaged by a lens system 38 on vertically separated split field photocells 39 and 41. Light from the horizontally displaced light source 36 forms an additional first and fourth Purkinje image pair in the eye image 29' which is also imaged by the lens system 38 but on horizontally separated split field photocells 42 and 43.

Figure 3:
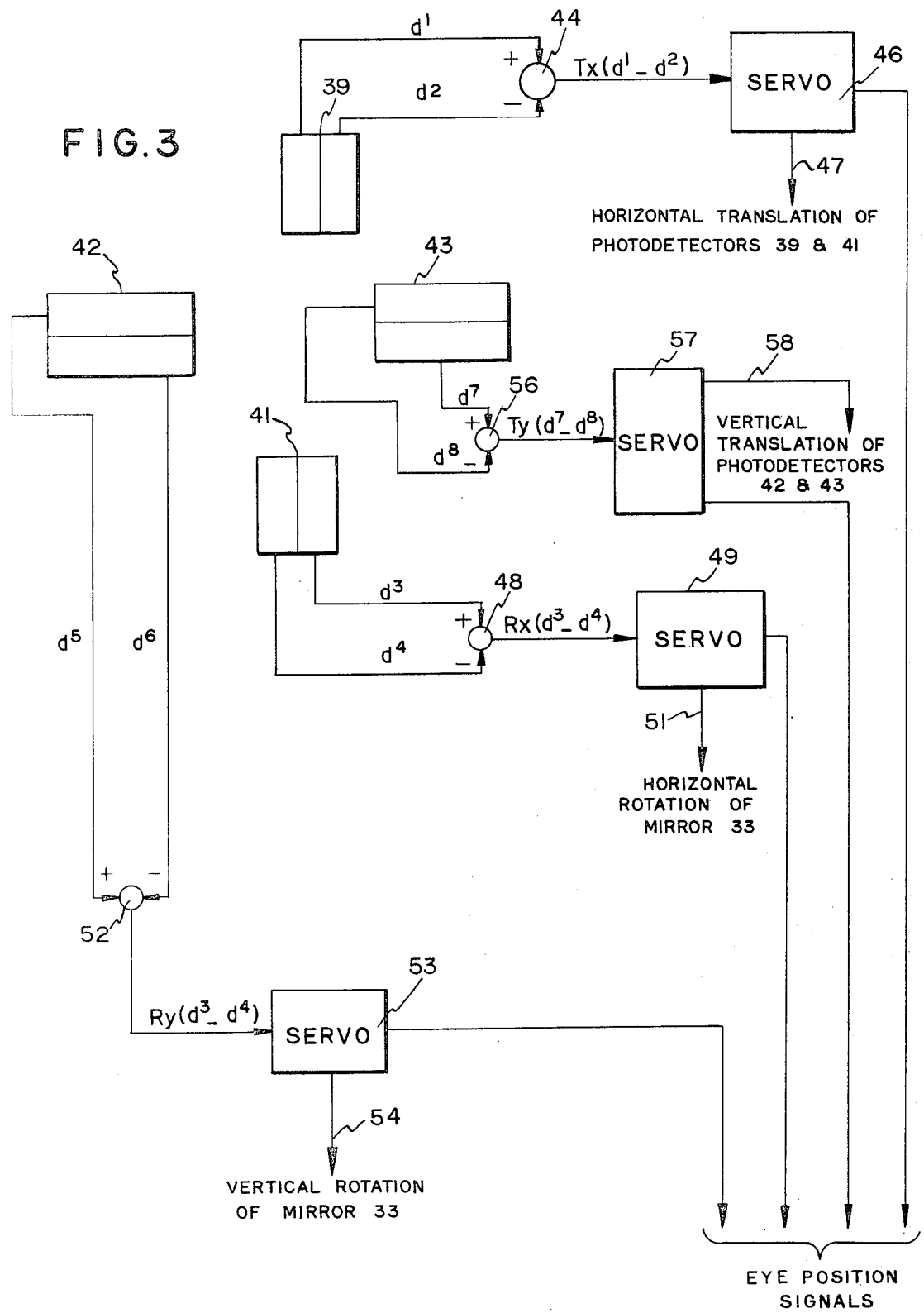
FIG. 3 illustrates in schematic form the electrical circuitry associated with the eye tracker of FIG. 2 for tracking rotational and translational eye movements.

Referring now to FIG. 3 there is shown in schematic form the four photodetectors 39, 41, 42 and 43 along with the associated servo systems and controls for tracking eye movements. Referring for the moment to the photodetector 39, it has two split fields which provide output signals labeled d1 and d2 which form inputs to a subtractor 44. The output of the subtractor 44 is a horizontal translation signal $T_x$ which forms the input to a servo system 46. The servo system 46 has output 47 which furnishes an output for controlling the horizontal translation of the photodetector system 39 and 41. Referring to the photodetector 41 it also has two split fields having outputs d3 and d4 which form inputs to a subtractor 48. The output of the subtractor 48 is a horizontal rotation control signal $R_x$ which serves as an input for a servo system 49. The servo system 49 has an output on circuit 51 which furnishes a signal for controlling the horizontal rotation of the mirror 33.

The split field photodetector 42 also has two fields having outputs d5 and d6 which form inputs to a subtractor 52. The output of the subtractor 52 is a vertical rotation signal $R_y$ which forms an input to a servo system 53. The output of the servo system 53 on circuit 54 is a control signal for controlling the vertical rotation of the mirror 33. The other horizontally offset photodetector 43 has two fields which have outputs d7 and d8 which form inputs to a subtractor 56. The output of the subtractor 56 is a vertical translation signal $T_y$ which forms an input to a servo system 57. The servo system 57 has an output 58 which controls the vertical translation of the photodetectors 42 and 43. The servo systems 46, 57, 49 and 53 all have outputs carrying signals indicative of the eye position. Thus the translation control signal $T_x$ (from the fourth Purkinje image) controls the horizontal or X position of the vertically displaced photodetectors 39 and 41, while the rotational control signal $R_x$ (from the first Purkinje image) controls the position of the high speed two-dimensional rotating mirror 33 in the X direction. If the eye rotates in the X direction the two Purkinje images will move in the horizontal direction, though by different amounts. These movements will generate simultaneous translation and rotation control signals. However, the rotation servo system is very much more rapid than the translation system. Thus before the translation system can move significantly, the effects of the eye rotation will be completely cancelled by rotation of the high speed mirror 33 and both the translation and rotation control signals from the servo system 46 and 49 will rapidly be driven to zero. In other words, the desired response to a pure rotation of the eye is a pure rotation of the high speed mirror 33 and this in effect will be the result.

On the other hand, the desired consequence of a pure translation of the eye (or head) is a pure translation of the measuring photodetectors, without any movement of the mirror 33. If the translation movement were very abrupt, then a transient $R_x$ rotation signal would be generated simultaneously with the $T_x$ signal, though the high speed mirror 33 would eventually return to its original position as the photodetectors 39 and 41 translated to the new position of equilibrium for both the first and fourth Purkinje images. In other words, for very abrupt translation movement there is a transient artifact in the rotation signal. The point, however, is that the types of translation artifacts that this system would handle are relatively slow compared with the abrupt rotational movements of the eye. In particular, translational movements that are slow compared with the response of the translation servo system will cause only insignificant artifact signals in the rotation system. Since the system nulls both the translation and the rotation error signals, a mixed eye movement (translation plus rotation) results in rotation of the mirror 33 and in translation of the photodetectors 39 and 41. The same comments as above hold for the photodetector 42 and 43 except that the photodetectors 42 and 43 which are horizontally separated are detecting vertical eye rotation and translation movements.

The output system shown in FIG. 3 is basically a null-measurement technique, in the sense that in steady state the corresponding first and fourth Purkinje images have zero separation in the direction of measurement. Any changes in magnification of the system (resulting for example from change in curvature of the eye lens, which would affect the refractive power for the fourth Purkinje image, or changes in axial distance between the eye and instrument) would not effect the steady state equilibrium position. For the horizontal movement control system, changes in vertical magnification have no effect whatsoever, whereas changes in horizontal magnification only alter the magnitude of the error signals and hence only the speed of response.

In summary, the eye tracker embodiment shown in FIGS. 2 and 3 utilizes two separate input light sources, each of which form a pair of first and fourth Purkinje images. The horizontally displaced Purkinje images are used to measure vertical rotation of the eye and the vertically displaced Purkinje images are used to measure horizontal rotation of the eye. The bright first Purkinje images are used to control the high speed two-dimensional mirror, the movements of which normally counteract the effects of eye rotation. The relatively dim fourth Purkinje images function only to correct for translational motions of the eye. An important consequence of this arrangement is that whenever the first Purkinje image is properly located on its photodetector, the fourth Purkinje image is also properly located on its photodetector, except for the small displacements due to translation.

Figure 4:
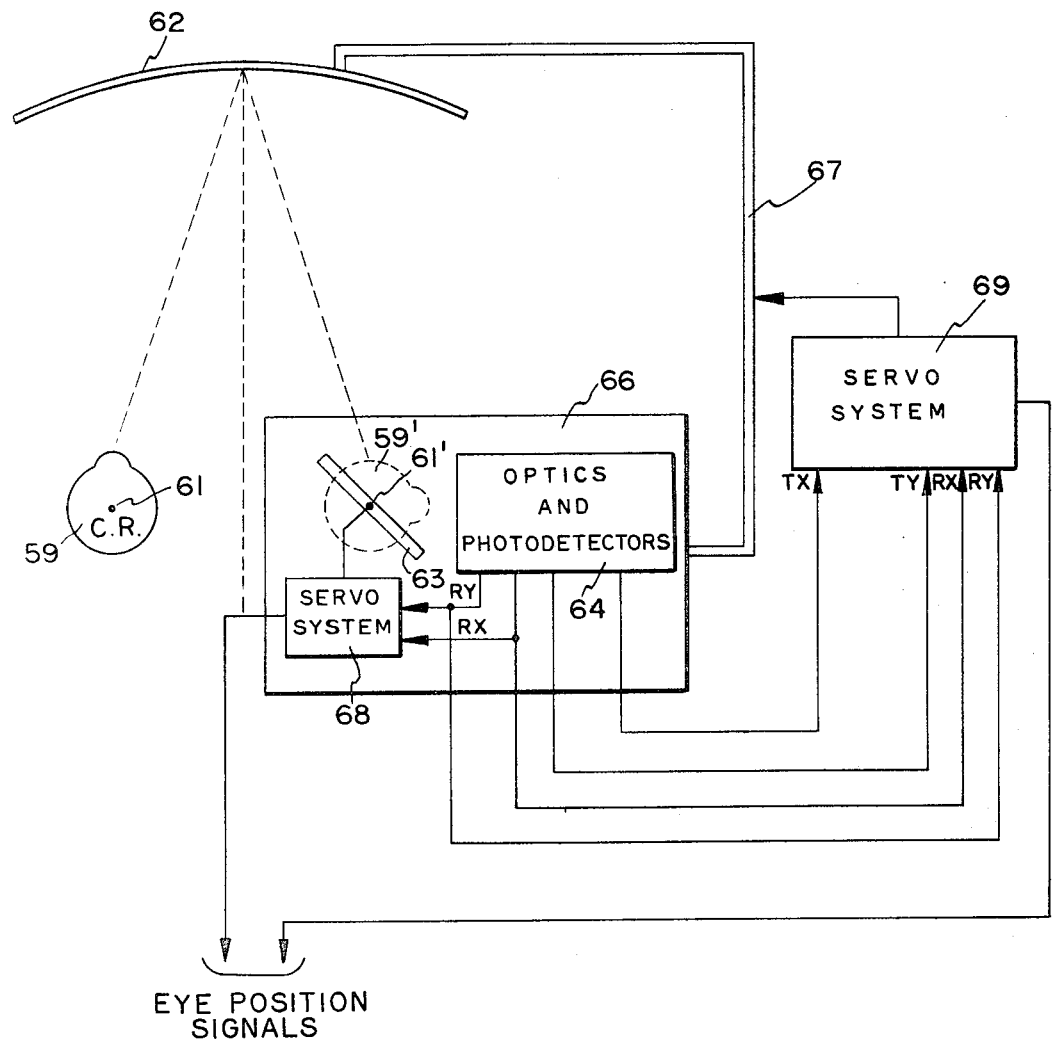
FIG. 4 is a schematic diagram of another eye tracker embodiment in which the concave mirror used to form an eye image is movable so as to accommodate a large field of operation for the eye tracker.

Referring now to FIG. 4, there is shown another embodiment of an eye tracker in accordance with this invention which is designed to accommodate or track very large translational movements of an eye (or head). In FIG. 4 an eye 59 having a center of rotation 61 has an image 59' formed with a corresponding center of rotation 61' by the concave mirror 62. As before, a relatively small two-dimensionally pivoted mirror 63 is disposed and pivoted about the center of rotation 61' of the eye image 59'. Suitable optics and photodetectors 64 are provided similar to that shown in FIGS. 2 and 3 for developing X and Y translation and rotation control signals indicated by the characters $T_x$, $T_y$, $R_x$, and $R_y$.

The optics and photodetectors 64 as well as the pivoted mirror 63 (the combination of which is indicated by reference numeral 66) are mechanically connected through a mechanical linkage 67 to the concave mirror 62. The optics and photodetectors 66 develop translation and rotation tracking signals $T_x$, $T_y$, $R_x$ and $R_y$. The rotation tracking signals $R_x$ and $R_y$ form inputs to a servo system 68 which controls rotation of the mirror 63. Both the rotation tracking signals $R_x$ and $R_y$ and the translation tracking signals $T_x$ and $T_y$ form inputs to a servo system 69. The servo system 69 is shown in FIG. 4 as controlling the positioning of the mechanical linkage 67. The servo system 69 is adapted to rotate in X and Y directions the concave mirror 62, the linkage 67 and the instrument package 66 in response to the rotation tracking signals $R_x$ and $R_y$. This rotation is about an implicit point which corresponds generally to the center of rotation 61 of the eye 59. The servo system 69 also is adapted to translate in X and Y directions the concave mirror 62, the linkage 67 and the instrument package 66 in response to the translation tracking signals $T_x$ and $T_y$.

The basic response of the apparatus shown in FIG. 4 to eye movements is as follows. In response to an abrupt eye rotation the mirror 63 is pivoted under control of the servo system 68 to make an immediate response to compensate, with the servo system 68 being controlled by the rotation tracking signals $R_x$ and $R_y$. Next, the entire apparatus including concave mirror 62, linkage 67 and the instrument package 66 begins to rotate under control of the servo system 69. As rapidly as the entire apparatus rotates, the mirror 63 returns toward its original position in the measuring system. In responsing to translation movements of the eye, the servo system 69 in response to the translation tracking signals $T_x$ and $T_y$ translates in X and/or Y directions the entire apparatus including the concave mirror 62, the linkage 67 and the instrument package 66. One advantage of such a complex tracking system is that the same portions of the concave mirror 62 are used, independent of eye position.

If desired, the system of FIG. 4 can be used with slight modifications to form another embodiment of an eye tracker in accordance with this invention. In this embodiment the rotating mirror 63 is exclusively used for tracking rotational eye movements. That is, the rotation tracking signals $R_x$ and $R_y$ are only inputs to the servo system 68 controlling pivoting of the mirror 63. The servo system 69 only receives in this embodiment the translation tracking signals $T_x$ and $T_y$ and the entire apparatus including concave mirror 62, the linkage 67 and the instrument package only translates in X and Y directions and does not rotate.

Although the invention has been described with respect to specific embodiments, it will be obvious to those skilled in the art that various modifications may be made to the specific embodiments disclosed herein without departing from the true spirit and scope of the invention.

We claim:

1. An eye tracker for continuously tracking orientation of an optic axis of an eye having a center of rotation and a cornea and a lens where the eye can translate in a horizontal and a vertical direction and also rotate in a horizontal and a vertical direction about its center of rotation, optical means for forming an image of the eye, a two-dimensionally pivoted reflecting surface disposed in the image of the eye and being pivoted at the center of rotation of the image of the eye, light source means for forming a light beam, optical means for directing said light beam into the eye image whereby light reflected by the cornea of the eye image forms a first Purkinje image and light reflected by the rear of the eye lens in the eye image forms a fourth Purkinje image, photodetecting means for generating electrical signals in response to light images falling thereon, centering means responsive to said electrical signals for centering the first and fourth Purkinje images on said photodetecting means, said centering means including means for moving at least one of said photodetecting means and for rotating said two-dimensionally pivoted reflecting surface, and said centering means developing position signals indicative of the orientation of the optic axis of the eye.

2. An eye tracker in accordance with claim 1 wherein said optical means for forming an image of the eye comprises a lens system.

3. An eye tracker in accordance with claim 1 wherein said optical means for forming an image of the eye comprises a concave mirror.

4. An eye tracker in accordance with claim 1 wherein said light source means comprises first and second light sources, said first light source being vertically offset with respect to the optic axis of the eye image for producing vertically separated first and fourth Purkinje images and said second light source being horizontally offset with respect to the optic axis of the eye image for producing horizontally separated first and fourth Purkinje images, and said photodetecting means including a pair of vertically spaced split-field photodetectors on which said vertically separated first and fourth Purkinje images are incident and a pair of horizontally spaced split-field photodetectors on which said horizontally separated first and fourth Purkinje images are incident.

5. An eye tracker in accordance with claim 4 wherein said vertically spaced photodetectors have vertically extending fields and said horizontally spaced photodetectors have horizontally extending fields.

6. An eye tracker in accordance with claim 5 wherein said centering means includes a servo system responsive to one of the vertically spaced photodetectors for controlling horizontal rotation of said two-dimensionally pivoted reflecting surface and a servo system responsive to the other of the vertically spaced photodetectors for controlling horizontal translation of both said vertically spaced photodetectors.

7. An eye tracker in accordance with claim 6 wherein said centering means further includes a servo system responsive to one of the horizontally spaced photodetectors for controlling vertical rotation of said two-dimensionally pivoted reflecting surface and a servo system responsive to the other of the horizontally spaced photodetectors for controlling vertical translation of both said horizontally spaced photodetectors.

8. An eye tracker in accordance with claim 7 wherein those of said servos which control rotation of said two-dimensionally pivoted reflecting surface are responsive to photodetectors on which first Purkinje images are incident.

9. An eye tracker in accordance with claim 5 wherein said centering means comprises means for rotating said two-dimensionally pivoted reflecting surface and means for commonly translating said optical means for forming an image of the eye, said rotating reflecting surface, and said photodetecting means.

10. An eye tracker in accordance with claim 9 further including means for commonly rotating with respect to the center of rotation of the eye image said optical means for forming an image of the eye, said rotating reflecting surface, and said photodetecting means.

11. A method of tracking rotational and translational movements of an eye having a lens and a cornea comprising the steps of optically forming an image of the eye, disposing a two-dimensionally pivoted reflecting surface in the eye image and pivoting it about the center of rotation of the eye image, projecting light into the eye image whereby light reflected by the cornea of the eye image forms a first Purkinje image and light reflected by the rear of the eye lens in the eye image forms a fourth Purkinje image, imaging the first and fourth Purkinje images on photodetecting means, generating electrical signals by said photodetecting means in response to the Purkinje images incident thereon, utilizing the electrical signals to control rotation of the two-dimensionally pivoted reflecting surface and translation of the photodetecting means to keep the Purkinje images centered on the photodetecting means, whereby the changes in position of the pivoted reflecting surface and photodetecting correspond to rotational and translational movements of the eye.

* * * * *